Feb. 26, 1952      T. ALBERS      2,587,270

PEDAL FOR BICYCLES OR LIKE VEHICLES

Filed Aug. 8, 1946

INVENTOR.
TEUNIS ALBERS
BY
Haseltine, Lake & Co.
AGENTS

Patented Feb. 26, 1952

2,587,270

UNITED STATES PATENT OFFICE 2,587,270

PEDAL FOR BICYCLES OR LIKE VEHICLES

Teunis Albers, Amsterdam, Netherlands

Application August 8, 1946, Serial No. 689,302
In the Netherlands April 2, 1946

3 Claims. (Cl. 74—594.4)

The invention relates to a pedal for a bicycle or like vehicle.

The known cycle pedals usually are made partially of metal and partially of another material, such as e. g. rubber or wood, to form supporting surfaces affording a steady frictional grip for the feet of the cyclist.

The invention has for its object a pedal construction, whereby not only material is saved but also the various parts, required in the known pedals, such as pins for the rubber blocks, screws, nuts and the like, may be avoided, so that the assembly of the pedal is highly simplified.

According to the invention the pedal consists in a single body preferably made by casting or pressing of light metal, or of a plastic or another convenient material, such as e. g. synthetic resins or other composed materials, said body being provided with a recess for the pedal axle and the pedal bearings. Moreover, according to the invention, the exterior surfaces, at least the foot-supporting surfaces may be milled or provided with notches, projections or the like.

Further, according to the invention, the pedal at the foot-supporting surfaces may be provided with one or more recesses or cut away portions. Thereby not only the weight of the pedal is still more reduced, but moreover the said recesses serve to prevent the foot from slipping under all circumstances. When the notches, projections or the like on the supporting surfaces are worn off the permanently sharp edges of the recesses assure that the foot is prevented from slipping, since the footwear under the pressure exerted on the pedal penetrates into the recesses.

In the drawings an embodiment of a pedal according to the invention is illustrated by way of example.

Figure 1:
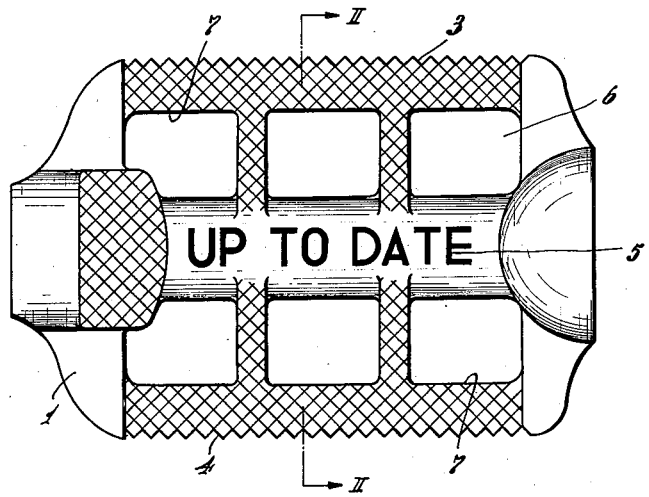
Fig. 1 shows the pedal in plan view.
Figure 2:
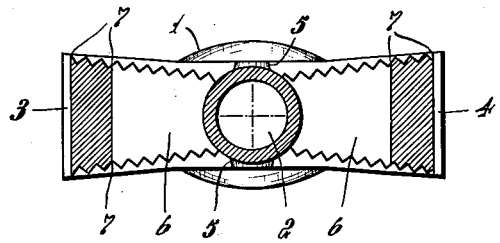
Fig. 2 is a section on the line II—II in Fig. 1.

The pedal consists in a body 1 made of light metal, plastic or any other convenient material preferably cast or pressed in one piece, said body being interiorly provided with a recess 2 for the pedal axle and the ball bearings or bushings.

The upper, lower, front and rear face of the body 1 are so constructed that they increase the friction with the foot. In the embodiment shown the front and rear face to this end are provided with grooves 3 and 4, while the upper and the lower face are provided with embossed characters 5. It will be clear that instead of or besides the grooves and characters other projections or the like, such as notches or ribs, may be used.

The upper and lower faces are further provided with recesses 6 leaving transverse walls 6' therebetween and preferably extending from the upper face to the lower face, said recesses serving to reduce the weight of the pedal, while the edges 7 thereof moreover prevent the foot from slipping when the characters or projections are worn off.

The recesses 6 as well as the pedal itself may have any desired configuration.

I claim:

1. In a cycle pedal made of a single piece of relatively light material selected from the class including light metals and synthetic resins and consisting of a rectangular framelike body having a central tubular portion which extends between the ends of the pedal for receiving a pedal axle, bearings and the like, the provision of transverse walls within the framelike body extending from the longitudinal side walls thereof to the central tubular portion, the foot-supporting surfaces formed by the longitudinal and transverse walls and by the central tubular portion being roughened, the outer diameter of the central tubular portion being less than the height of the longitudinal walls, and the height of the transverse walls decreasing gradually from the longitudinal side walls to the central tubular portion, whereby the roughened foot-supporting surfaces of the pedal are of substantially concave form.

2. In a cycle pedal as claimed in claim 1 the provision of grooves and teeth in the outer lateral surfaces of the longitudinal side walls.

3. A bicycle pedal according to claim 1 in which the roughening of the foot-supporting surfaces consists of indentations of the longitudinal and transverse walls and of characters on the central tubular portion.

TEUNIS ALBERS.

REFERENCES CITED

The following references are of record in the file of this patent:

UNITED STATES PATENTS

| Number | Name | Date |
|---|---|---|
| D. 136,771 | Adams | Dec. 7, 1943 |
| 955,957 | Francis | Apr. 26, 1910 |
| 1,600,010 | Peace | Sept. 14, 1926 |

FOREIGN PATENTS

| Number | Country | Date |
|---|---|---|
| 833,569 | France | Oct. 25, 1938 |